United States Patent
Henck et al.

(10) Patent No.: US 9,845,083 B2
(45) Date of Patent: Dec. 19, 2017

(54) PARK BRAKE CONTROL ASSEMBLY

(71) Applicant: Dura Operating LLC, Auburn Hills, MI (US)

(72) Inventors: Jeremy M. Henck, White Lake, MI (US); Brian E. Steakley, Sterling Heights, MI (US)

(73) Assignee: Dura Operating, LLC, Auburn Hills, MI (US)

( * ) Notice: Subject to any disclaimer, the term of this patent is extended or adjusted under 35 U.S.C. 154(b) by 215 days.

(21) Appl. No.: 14/789,222

(22) Filed: Jul. 1, 2015

(65) Prior Publication Data

US 2017/0001605 A1 Jan. 5, 2017

(51) Int. Cl.
*G05G 1/30* (2008.04)
*B60T 7/04* (2006.01)

(52) U.S. Cl.
CPC ............... *B60T 7/045* (2013.01); *G05G 1/30* (2013.01)

(58) Field of Classification Search
CPC ... B60T 7/04; B60T 7/045; B60T 7/06; G05G 1/30; G05G 1/305; G05G 1/44; G05G 5/03
See application file for complete search history.

(56) References Cited

U.S. PATENT DOCUMENTS

| | | | | |
|---|---|---|---|---|
| 4,391,159 A | * | 7/1983 | Sellmeyer | B60T 7/047 74/516 |
| 4,841,798 A | * | 6/1989 | Porter | B60T 7/047 74/501.5 R |
| 4,872,368 A | * | 10/1989 | Porter | B60T 7/047 74/512 |
| 5,211,072 A | * | 5/1993 | Barlas | B60T 7/047 74/512 |
| 5,217,094 A | | 6/1993 | Walter | |
| 5,235,867 A | * | 8/1993 | Wortmann | B60T 7/108 74/501.5 R |
| 5,309,786 A | * | 5/1994 | Pare | B60T 7/045 74/501.5 R |
| 5,467,666 A | | 11/1995 | Soucie et al. | |
| 5,533,420 A | * | 7/1996 | Perisho | B60T 7/047 74/501.5 R |
| 5,588,335 A | | 12/1996 | Strait | |
| 5,775,174 A | | 7/1998 | Kanbe et al. | |

(Continued)

*Primary Examiner* — Adam D Rogers
(74) *Attorney, Agent, or Firm* — Reising Ethington P.C.; Matthew J. Schmidt; Robert E. Ford (57) ABSTRACT

A parking brake control assembly having a brake actuator includes an engagement member, a retention member, a release actuator, and a biasing member. In a first position of brake actuator, the retention member is arranged to engage the engagement member upon movement of the brake actuator from a first position to a second position to hold the brake actuator in the second position. Movement of the brake actuator from the first to the second position causes the release actuator to move relative to the retention member such that the biasing member provides a force on the retention member tending to disengage the retention member from the engagement member so that upon movement of the brake actuator to return the brake actuator from the second position to the first position, the retention member disengages from the engagement member enabling the brake actuator to be returned to the first position.

20 Claims, 10 Drawing Sheets

(56) References Cited

U.S. PATENT DOCUMENTS

| | | | |
|---|---|---|---|
| 6,736,025 B2* | 5/2004 | Kanbe | B60T 7/045 |
| | | | 74/535 |
| 6,837,127 B2* | 1/2005 | Schumacher | B60T 7/045 |
| | | | 74/512 |
| 7,337,694 B2* | 3/2008 | Ninomiya | B60T 7/045 |
| | | | 74/535 |
| 7,472,624 B2* | 1/2009 | Revelis | B60T 7/045 |
| | | | 74/512 |
| 7,574,943 B2 | 8/2009 | Wortmann | |
| 7,584,684 B2* | 9/2009 | Shibui | G05G 1/44 |
| | | | 74/560 |
| 8,025,129 B2* | 9/2011 | Gresley | B60T 7/06 |
| | | | 188/18 R |
| 8,113,086 B2* | 2/2012 | Eckerle | B60T 7/06 |
| | | | 74/512 |
| 8,245,596 B2* | 8/2012 | Hanna | B60T 7/06 |
| | | | 74/512 |
| 8,707,819 B2 | 4/2014 | Hanna et al. | |
| 9,139,169 B2* | 9/2015 | Hanna | B60T 7/045 |
| 9,278,671 B2* | 3/2016 | Nagata | B60T 7/045 |
| 9,487,192 B2* | 11/2016 | Ohki | B60T 7/06 |
| 2007/0068317 A1* | 3/2007 | Krupin | B60T 7/104 |
| | | | 74/502.2 |
| 2007/0227288 A1* | 10/2007 | Ferenc | B60T 7/045 |
| | | | 74/512 |
| 2007/0227290 A1 | 10/2007 | Ferenc et al. | |

* cited by examiner

PARK BRAKE CONTROL ASSEMBLY

TECHNICAL FIELD

The present disclosure relates to a vehicle parking brake control assembly.

BACKGROUND

In some vehicles, a parking brake in a passenger compartment of the vehicle can be actuated by a user depressing a lever from an initial brake-released position to a brake-applied position using the user's foot. In some vehicles, the parking brake can be released by again depressing the lever allowing the pedal to return to the brake-released position. The parking brake must be reliable in use and capable of repeated actuations and resetting for continued use.

SUMMARY

In at least some implementations, a parking brake control assembly is provided having a brake actuator movable between a first position and a second position. The parking brake control assembly may include: an engagement member associated with the brake actuator; and a control mechanism that includes: a retention member; a release actuator that moves relative to the retention member as the brake actuator moves between the first and second positions; and a biasing member acting on the retention member and responsive to the movement of the release actuator. In the first position of the brake actuator, the retention member is arranged to engage the engagement member upon movement of the brake actuator from the first position to the second position. Movement of the brake actuator from the first position to the second position causes the release actuator to move relative to the retention member such that the biasing member provides a force on the retention member tending to disengage the retention member from the engagement member. In such an arrangement, upon movement of the brake actuator from the second position to the first position, the retention member disengages from the engagement member enabling the brake actuator to return to the first position and the assembly to be reset to an initial position for future parking brake actuations.

In at least some implementations, a parking brake control assembly is provided. The assembly includes a brake actuator movable between a first position and a second position, an engagement member carried by the brake actuator for movement with the brake actuator, and a control mechanism. The control mechanism may include: a coupler, a retention member arranged for rotation about the coupler and translation relative to the coupler, a release actuator arranged for rotation about the coupler and for rotation relative to the retention member, and a biasing member coupled to the retention member and the release actuator to yieldably bias the retention member for rotation about the coupler. When the brake actuator is in the first position the biasing member biases the retention member in a first direction about the coupler. Movement of the brake actuator from the first position to the second position causes movement relative to the coupler of the retention member and the release actuator so that the biasing member biases the retention member in a second direction about the coupler that is opposite to the first direction.

Other embodiments can be derived from combinations of the above and those from the embodiments shown in the drawings and the descriptions that follow.

BRIEF DESCRIPTION OF THE DRAWINGS

The following detailed description of preferred implementations and best mode will be set forth with regard to the accompanying drawings, in which.

DETAILED DESCRIPTION OF PREFERRED EMBODIMENTS

Figures 1, 2:
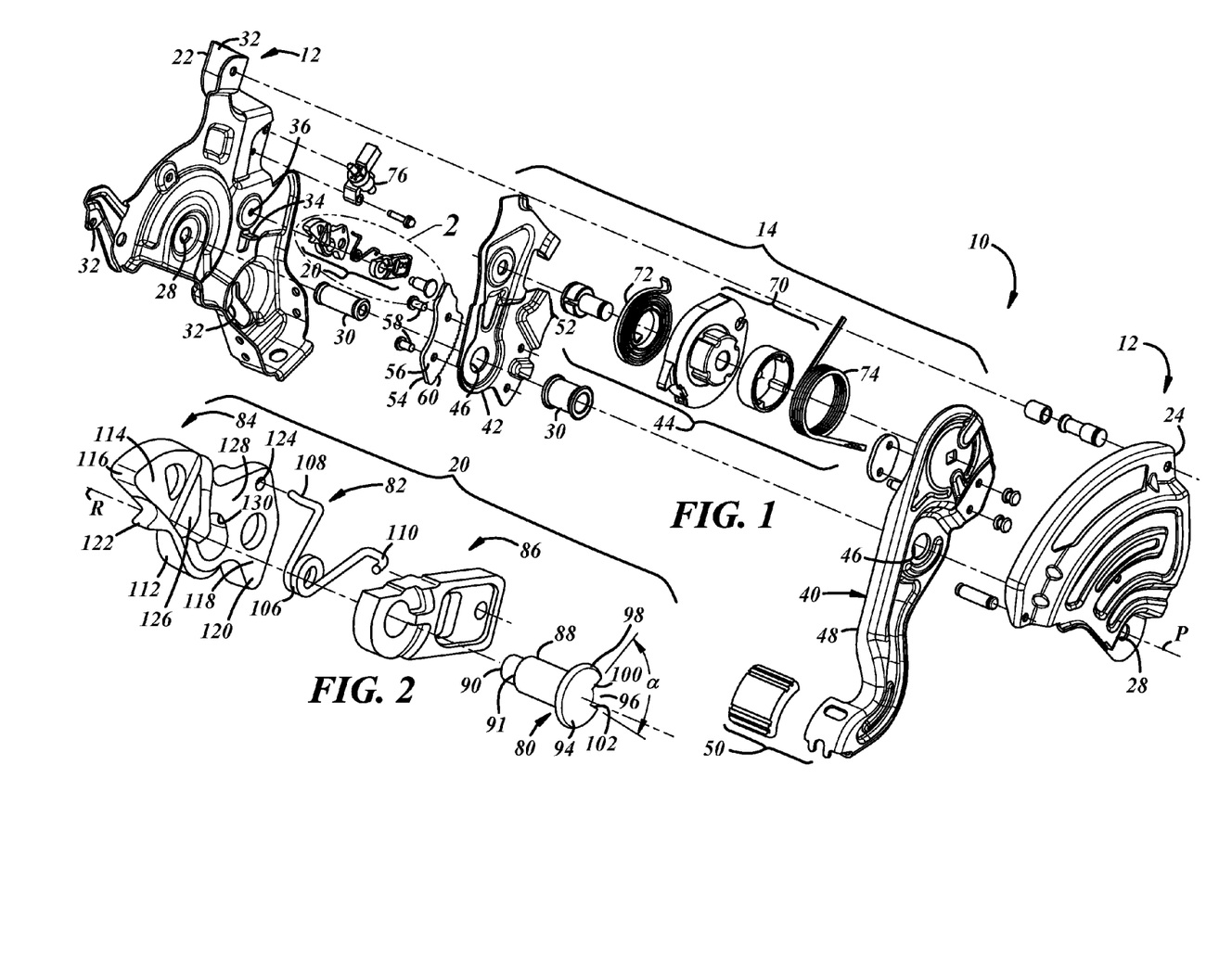
FIG. 1 is an exploded view of a parking brake actuator.
FIG. 2 is an enlarged view of a portion of the exploded view of FIG. 1.

Referring in more detail to the drawings, FIG. 1 shows an exploded view of a parking brake actuator 10 for a vehicle such as a passenger car, sport utility vehicle (SUV), pick-up truck, or the like. The parking brake actuator 10 enables a vehicle user to engage a vehicle wheel brake mechanism by pushing an actuator (shown as a lever) and then to later disengage the brake mechanism by pushing the lever again. While the lever in the illustrated embodiment is designed to be foot-actuated, it should be appreciated that this is merely an example.

Figures 3, 4:
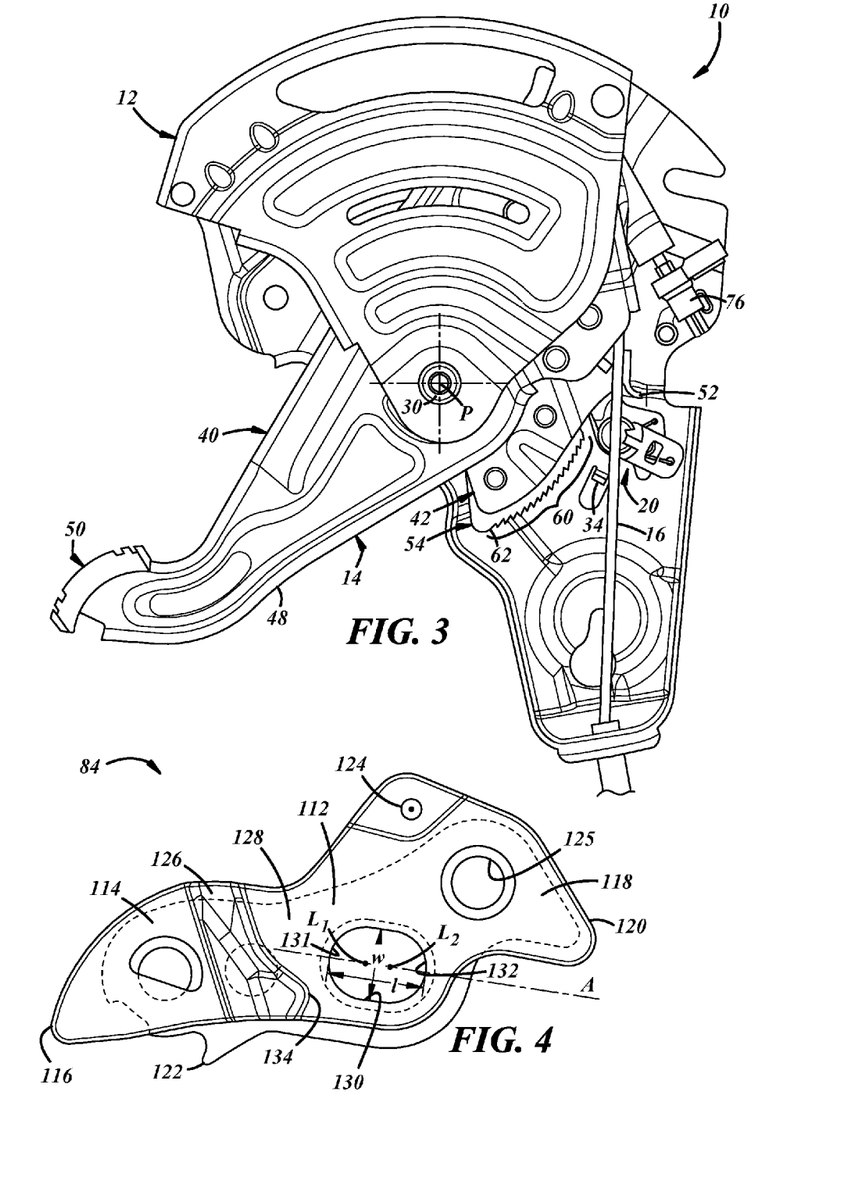
FIG. 3 is an assembled side view of the parking brake actuator shown in FIG. 1.
FIG. 4 is a side view of a pawl.

FIGS. 1-3 illustrate one implementation of the parking brake actuator 10 which may include a mount or support 12, a pedal assembly 14 carried by the support 12, a control cable 16 (FIG. 3 only), and a control mechanism 20 carried by the support 12. The illustrated support 12 is a two-part assembly having a first bracket 22 and a second bracket 24 secured together and supporting the pedal assembly 14 therebetween. Both first and second brackets 22, 24 may include pivot holes 28 along a pivot axis P that are sized to receive one or more bushings and axle components 30 for carrying the pedal assembly 14. Support 12 is also provided with suitable features 32 for securing the support to a vehicle support structure (not shown) adjacent, e.g., the driver's position in the vehicle. In at least one embodiment, first bracket 22 has a travel stop 34 adapted to limit rotation of the control mechanism 20, as will be explained in greater detail below. Here, the stop 34 is shown as a tab extending outwardly of the first bracket 22 toward the second bracket 24; however, this is merely an example. In addition, the first bracket 22 may have a rivet hole 36 for carrying the control mechanism 20 (FIG. 1 only). In this way, the support 12 enables the actuator 10 to be provided as a self-contained unit that may be readily incorporated into a vehicle. At least portions of the support 12 could be provided in the vehicle directly, such as on or being defined by existing vehicle structures.

Pedal assembly 14 comprises a first bracket 40, a second bracket 42, and a self-adjust mechanism 44, as best shown in FIG. 1. First and second brackets 40, 42 also include pivot holes 46 along pivot axis P which are sized to receive the one or more of the bushings and axle components 30. In addition, first bracket 40 includes an actuator or lever 48 extending radially outwardly to a pedal pad 50 for foot-actuation by the vehicle user (e.g., driver of the vehicle). Second bracket 42 may include a bumper 52 which is adapted to initiate a resetting of the control mechanism 20, which will be explained in greater detail below (see FIGS. 1 and 3). And second bracket 42 includes an engagement member 54 (shown as a sector) which is fixedly coupled thereto.

Sector 54 may have a curved row of ratchet teeth 60 extending along a portion of a peripheral edge 62 (see FIG. 3). More specifically, sector 54 is oriented so that ratchet teeth 60 are disposed circumferentially or arcuately relative to pivot axis P. While engagement member 54 is illustrated as a sector, it should be appreciated that this is merely an example and that other engagement member embodiments are contemplated (e.g., having different shapes, sizes, or both).

Self-adjust mechanism 44 of pedal assembly 14 includes a drum and track assembly 70, a clock spring 72, and a torsion or clutch spring 74, as shown in FIG. 1. Drum and track assembly 70 may be coupled to one end of control cable 16 (FIG. 3 only), and spring 74 may place the control cable 16 under a predetermined preload (tension). Clock spring 72 is adapted to automatically take up any slack in cable 16 (i.e., self-adjust). In this manner, self-adjust mechanisms 44 do not require re-tensioning of cable 16 at a later time. This may be desirable if the cable 16 becomes stretched or worn; and in some instances, manufacturing tolerances (e.g., due to stack up) may be relaxed due to the self-adjusting nature of the mechanism 44.

Control cable 16 is coupled to self-adjust mechanism 44 through a sleeve 76, as shown in FIG. 3. A distal end of the control cable 16 (not shown) is operably connected to the wheel brake mechanism (not shown). Hence, pulling the cable 16 causes the wheel brake mechanism to be applied.

When assembled, support 12 carries pedal assembly 14 allowing it to be rotated about pivot axis P. Pedal pad 50 may be located on one side of the pivot axis P, and self-adjust mechanism 44 may be located on the other side—so that when the pedal pad 50 is actuated (e.g., in a counterclockwise direction, see FIG. 1), tension in control cable 16 increases thereby applying the wheel brake mechanism. FIG. 3 illustrates an initial brake-released position of the parking brake actuator 10. From this position, pedal assembly 14 can be rotated counterclockwise via force on pedal pad 50—ultimately engaging the control mechanism 20 with sector 54 which rotates with the pedal assembly 14 (this engagement will be explained in greater detail below). When pedal pad 50 force is removed, the engagement results in the actuator 10 being in a brake-applied position. In the brake-applied position, the wheel brake mechanism (not shown) is engaged due to greater tension in control cable 16. To release the engagement, a force is applied again to the pedal pad 50 (e.g., in the counterclockwise direction). This counterclockwise rotation automatically disengages control mechanism 20 from sector 54, which will be explained in greater detail below. When the control mechanism 20 is disengaged (and pedal pad force is removed), tension in control cable 16 rotates pedal assembly 14 (and sector 54) clockwise, returning pedal assembly 14 to the initial brake-released position.

In at least one embodiment (see FIG. 2), the control mechanism 20 may include a coupler 80 (illustrated as a rivet), a biasing member 82 (illustrated as a spring), a retention member 84 (illustrated as a pawl), and a release actuator 86 (illustrated as a flipper). Rivet 80 has a longitudinally extending shaft 88 (along a rivet axis R), the shaft 88 having a narrow end 90 adapted to be received in the rivet hole 36 of the bracket 22 (FIG. 1) and defining a shoulder 91 adapted to engage the bracket 22 (see also sectional view of FIG. 7). Opposite the end 90, rivet 80 may have a cap or head 94 having a larger diameter than the shaft 88.

Rivet head 94, in at least one embodiment, has a void 96 in a portion of the head 94 that extends radially inwardly from an outer edge 98 of the head 94 and at least partially defines a first stop surface 100 and a second stop surface 102 spaced from one another by an angle (a) with respect to rivet axis R. Other embodiments of rivet head 94 also exist. For example, as will be explained in greater detail below, void 96 is optional.

Spring 82 may be any suitable spring for mechanically coupling the pawl 84 and flipper 86 and biasing them with respect to one another (e.g., so that the pawl 84 is responsive to movements of the flipper 86, or vice-versa). In at least one embodiment (see FIG. 2), spring 82 is a torsion spring comprising a coil 106, a first leg 108 associated with and/or acting on the pawl 84, and a second leg 110 associated with and/or acting on the flipper 86. The strength of spring 82 (e.g., and corresponding biasing forces between legs 108, 110) may vary depending upon the amount of flexure of legs 108, 110 (during operation) and the characteristics of spring 82 (e.g., material, diameter of legs 108, 110, length of legs 108, 110, etc.).

Pawl 84 may have an elongated, planar body 112 having a head 114 at one end 116 and a tail 118 at an opposite end 120 (FIGS. 2 and 4). Pawl 84 may have a tooth or hook 122 sized and shaped to engage the teeth 60 of sector 54; e.g., located nearer head 114. Tail 118 may include a coupling region 124 sized to receive leg 108 of spring 82. Coupling region 124 is illustrated as through-hole; however, this is merely an example—other implementations are possible. Between the head 114 and tail 118, pawl 84 may have an axially extending ridge 126 on one face 128; it also may have a rivet opening 130 between the ridge 126 and tail 118 which opening extends through the body 112.

As shown in FIG. 4, ridge 126 may have a shoulder or driving member 134 radially extending from the ridge 126 toward rivet opening 130. Other implementations of driving member 134 also exist; e.g., driving member 134 could be any other structure axially extending from face 128, such as a pin or post.

Rivet opening 130 may be sized to receive the rivet shaft 88 therethrough. More particularly, it may be larger than the rivet shaft 88 and may be defined by an elongated slot to permit movement of pawl 84 relative to the rivet 80. The slot 130 may be smaller in one dimension than another dimension to permit rotation of the pawl 84 relative to the coupler and to permit translation of the pawl 84 relative to the coupler. In the implementation shown, slot 130 has a width (w) closely matched to the shaft 88 diameter and a length (l) greater than the shaft 88 diameter so that pawl 84 may move relative to the rivet 80 in the length (l) direction of the slot (and move less, or not at all, in the width (w) direction of the slot). The length (l) of the slot 130 may be defined by the spacing between a first end 131 (nearer the head 114) and a second end 132 (nearer the tail 118). The position of opening 130 (e.g., between hook 122 and coupling region 124) and orientation of the elongation enables pawl 84, during operation of actuator 10, to move within opening 130 and/or pivot about opening 130 as spring 82 forces act on hook 122 and coupling region 124, as will be described in detail later.

In at least one embodiment, the position of rivet opening 130 and coupling region 124 may have a predefined relationship. For example, rivet opening 130 is shown with a reference line A passing through the first and second ends 131, 132 and the first and second locus points $L_1$, $L_2$, where first locus point $L_1$ is nearer the head 114 (and driving member 134) and where second locus point $L_2$ is nearer the tail 118. When the pawl 84 is assembled on rivet 80, locus point $L_1$ may be a position generally coincident with axis R when rivet shaft 88 abuts the first end 131. Similarly, locus point $L_2$ may be a position generally coincident with axis R when rivet shaft 88 abuts the second ends 132 (see e.g., FIGS. 9 and 13).

Pawl 84 may be manufactured from any suitably rigid and durable material(s). In one implementation, pawl 84 includes a two-piece construction of a metal and a rubber or a plastic. For example, pawl 84 may have metal at locations contacted by other components such the rivet 80 and sector 54. Other portions may have a plastic sleeve or be plastic-coated. This of course is merely one example; other single- and multi-piece implementations are contemplated also.

Figure 5:
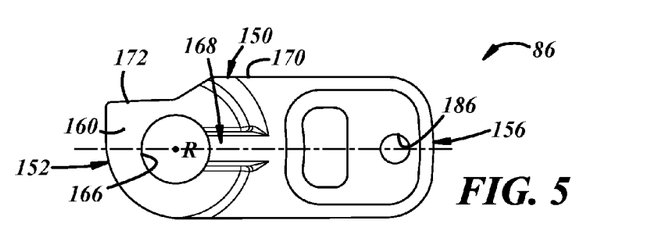
FIG. 5 is a side view of a release flipper.
Figures 6, 7, 9:
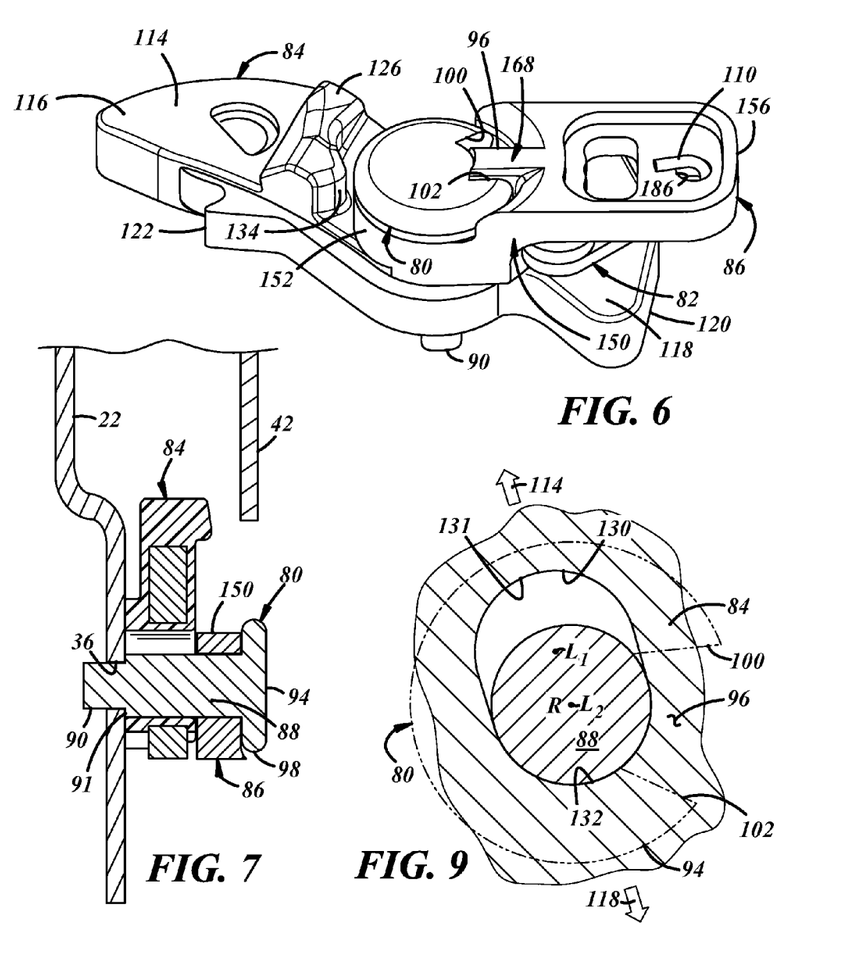
FIG. 6 is a perspective view of a control mechanism that includes the pawl and flipper of FIGS. 4 and 5.
FIG. 7 is a sectional view of the control mechanism shown in FIG. 6.
FIG. 9 is an enlarged view of the partial sectional view shown in FIG. 8, a head of a rivet shown in phantom to illustrate the position of the pawl relative to a rivet shaft.

As shown in FIGS. 5-7, flipper 86 may include a body 150 having a coupling end 152 and a free end 156. Coupling end 152 has a partially, circumferentially extending counterbore surface 160 around a through-hole 166 which is closely matched to the diameter of rivet shaft 88. A feature or projection 168 is shown extending axially away from the counterbore surface 160 and also extending radially away from opening 166 towards free end 156. Projection 168 is designed to cooperate with travel stop surfaces 100, 102 of rivet head 94 (as discussed below).

A driven surface 172 of flipper 86 may be located at one side 170 of flipper 86 and may extend at least a portion of the length between coupling end 152 and axis R (which passes through opening 166, FIG. 5). When control mechanism 20 is assembled and operated, driven surface 172 may be positioned to interact with driving member 134 of pawl 84, as will be explained more below.

Free end 156 of flipper 86 includes a coupling region 186 arranged to receive the leg 110 of spring 82. Coupling region 186 may be located between the free end 156 and axis R.

Thus, in at least one embodiment, driven surface 172 and coupling region 186 may be on opposing sides of axis R. Coupling region 186 is illustrated as a through-hole; however, this is not required. In at least one embodiment (FIG. 5), coupling region 186, projection 168, and the rivet axis R (and through-hole 166) are aligned radially; however, other implementations also may be used.

FIGS. 6-7 illustrate an assembled control mechanism 20. Rivet shaft 88 may be received through rivet hole 166 of flipper 86, through rivet opening 130 of pawl 84, and into rivet hole 36 of first bracket 22. The end 90 of shaft 88 may be located in rivet hole 36 while shoulder 91 abuts the region about hole 36 on first bracket 22 (FIG. 7). Thus, flipper 86 and pawl 84 may be captured between the first bracket 22 and rivet head 94. As shown in FIG. 7, pawl 84 may be positioned between the first bracket 22 and flipper 86, and flipper 86 may be positioned between pawl 84 and rivet head 94. Rivet head 94 may be received adjacent to the counterbore surface 160, and projection 168 may be located within void 96 and pivotal motion of flipper 86 relative to the rivet 80 may be limited in accordance with angle (a) between the travel stop surfaces 100, 102. Leg 108 of spring 82 may be located in coupling region 124 of pawl 84; leg 110 of spring 82 may be located in coupling region 186 of flipper 86—and when assembled, control mechanism 20 is located in actuator 10, the pawl 84 and flipper 86 may be oriented with respect to one another so that legs 108, 110 are biased away from one another.

During operation, spring 82 (as well as other structures) may act upon pawl 84 and flipper 86 to rotate the pawl and flipper relative to rivet 80 and slide the pawl relative thereto. In a first position, pawl 84 and flipper 86 may be yieldably biased into the path of movement of the sector 54 (carried by pedal assembly 14). When sector 54 is rotated toward the parking brake-applied position, pawl 84 may engage sector 54. And when the assembly is in the brake-applied position, the flipper 86 and pawl 84 may be driven to a second position wherein the pawl 84 is yieldably biased by the spring 82 out of the path of the sector 54 so that when the pedal assembly 14 is released from the brake-applied position, the pawl 84 is displaced out of the sector's path thereby allowing the sector to return to the initial parking brake-released position. While the pedal assembly and sector 54 return to the initial brake-applied position, pawl 84 may be returned to the first position—thus, the assembly may be ready for the parking brake to be re-applied.

During operation of parking brake actuator 10, when a sufficient force is applied to the pedal pad 50 (e.g., in a counterclockwise direction), pedal assembly 14 rotates counterclockwise about pivot axis P from the initial parking brake-released position to the parking brake-applied position. As will be explained below, to maintain the actuator 10 in the brake-applied position, pawl 84 engages the sector 54. When a subsequent force is applied to the pedal pad 50 (again in the counterclockwise direction), the pawl 84 is automatically disengaged from the sector 54 enabling cable tension to rotate pedal assembly 14 clockwise and return it to the initial brake-released position.

Figure 8:
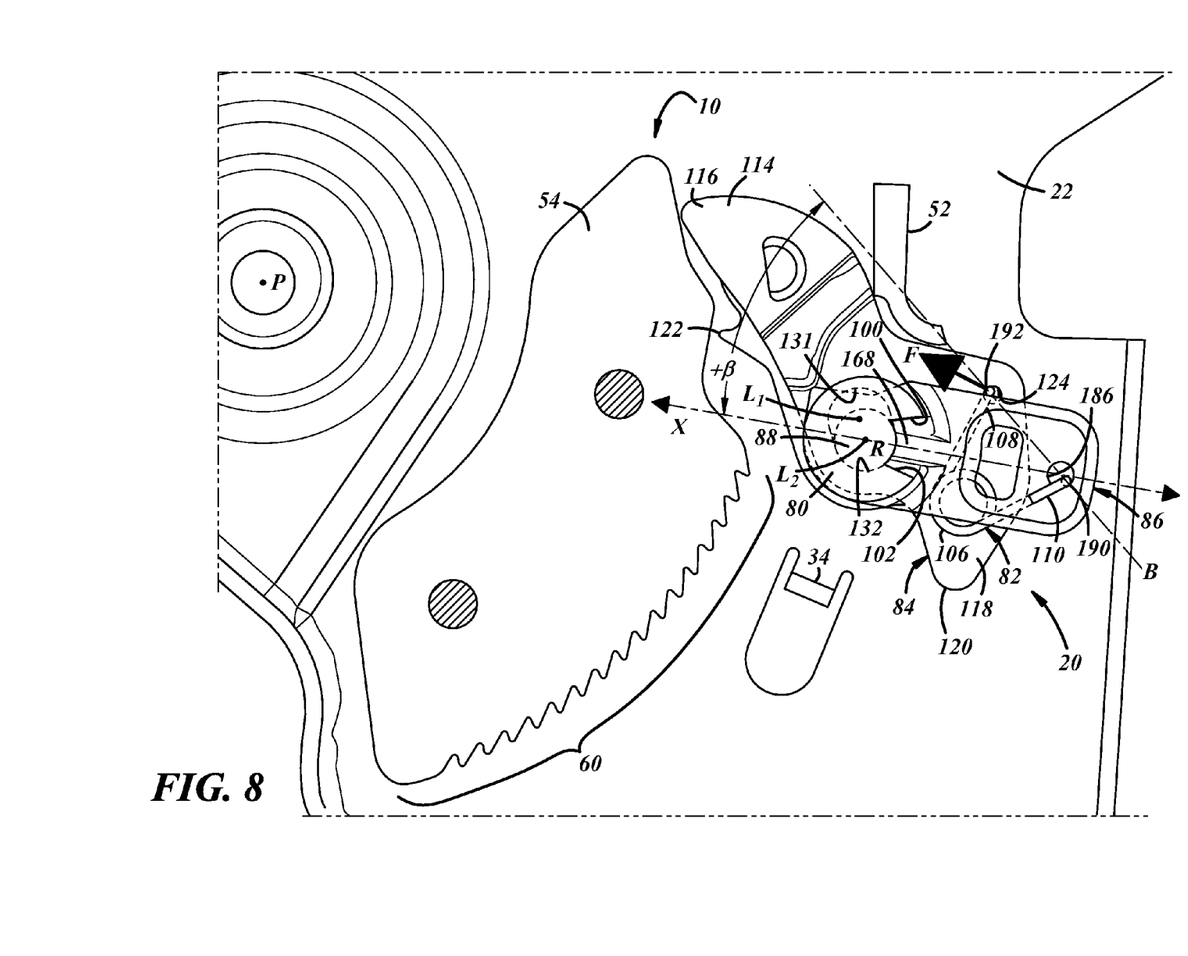
FIG. 8 is a partial sectional view of the parking brake actuator in an initial, brake-released position.

FIG. 8 shows a partial sectional view of parking brake actuator 10 illustrating the initial brake-released position. In this position, the hook 122 of pawl 84 is not engaged with any teeth 60 of the sector 54, and pawl 84 is oriented about the rivet shaft 88 so that head 114 is yieldably biased toward sector 54. Rivet 80 abuts end 132 in opening 130 (e.g., rivet axis R may be coincident with locus point $L_2$) (see also FIG. 9). Further, flipper projection 168 may be between rivet head stops 100, 102, and spring legs 108, 110 may not being flexed or otherwise biased outwardly (e.g., may be at rest).

FIG. 8 also illustrates a plane X which may be defined by axis R of rivet 80 and a contact point 190 between spring leg 110 and flipper 86. During operation, contact point 190 may shift or move within region 186 considerably (e.g., depending on relative positions of the pawl 84 and flipper 86, as well as the size of coupling region 186). In FIG. 8, a second contact point 192 associated with spring leg 108 and coupling region 124 of pawl 84 is illustrated as well. When the second contact point 192 is on one side of plane X (as shown in FIG. 8), pawl 84 is urged counterclockwise. As will be explained in greater detail below, when the second contact point 192 shifts to the other side of plane X, pawl 84 may be urged clockwise. Similarly, a reference line B (defined by contact points 190, 192) is shown intersecting plane X at an angle ($\beta$), and when angle ($\beta$) is positive (as it is in FIG. 8), pawl 84 is urged counterclockwise. (And as will be explained below, when angle ($\beta$) is negative, pawl 84 is urged clockwise.) Pawl 84 and flipper 86 may remain in the position shown in FIG. 8 until the pedal assembly 14 is rotated about pivot P to actuate the wheel brake mechanism.

Figure 10:
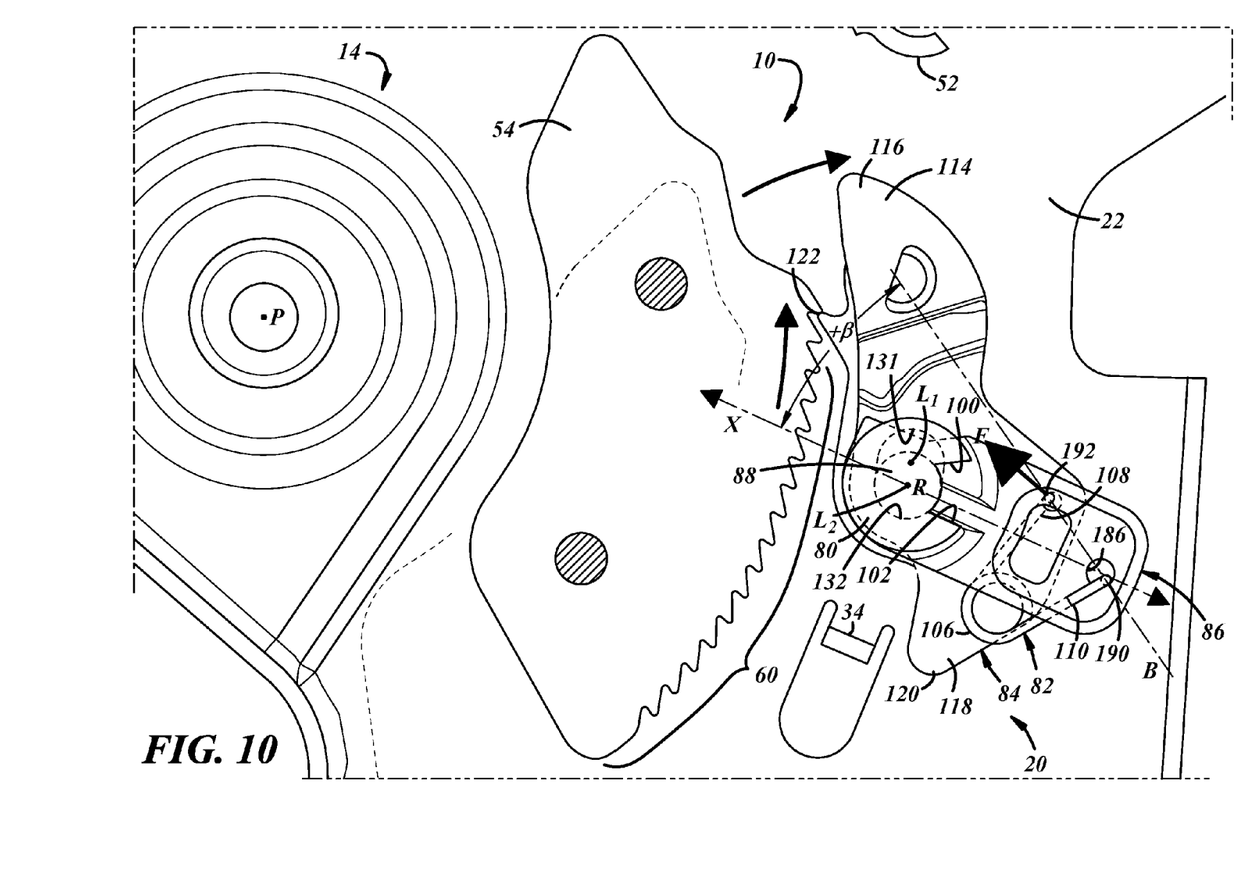
FIG. 10 is a partial sectional view of the parking brake actuator where a sector has been rotated partially counterclockwise with respect to the pawl.

In FIG. 10, pedal assembly 14 has been rotated at least partially counterclockwise from the brake-released position toward the brake-applied position. During rotation, sector 54 has engaged the pawl 84 and rotated the pawl clockwise against the force of spring 82. Hook 122 is shown here to be touching a tip of one of the plurality of ratchet teeth 60. As pawl 84 is rotated, the flipper 86 also is rotated clockwise by the force of spring 82 until projection 168 of flipper 86 engages the second travel stop 102 of rivet 80 which prevents further clockwise rotation of flipper 86. The direction of force F has changed, but force F still biases pawl 84 counterclockwise about rivet 80 (e.g., as the second contact point 192 remains on the same side of plane X as was shown in FIG. 8, and the angle ($\beta$) remains positive). In addition, rivet shaft 88 remains near or abutting the second end 132 of pawl opening 130.

Figure 11:
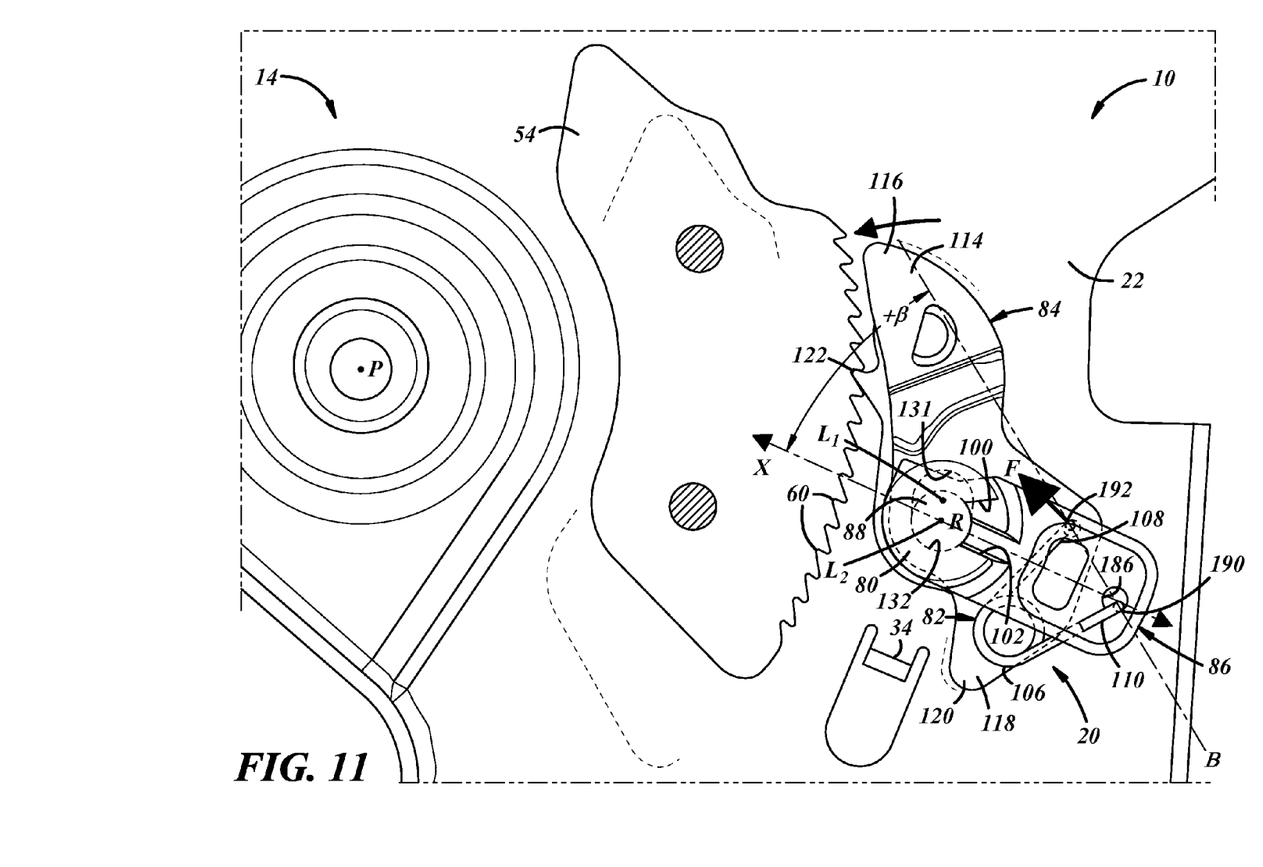
FIG. 11 is a partial sectional view of the parking brake actuator where the sector has been rotated farther counterclockwise than shown in FIG. 10 and a hook of the pawl is between two teeth of the sector in a partial brake-applied position.

In FIG. 11, pedal assembly 14 (and sector 54 which is connected thereto) has been rotated further counterclockwise, and hook 122 is received between two of the ratchet teeth 60. FIG. 11 is otherwise generally similar to FIG. 10 and illustrates a moment in time before the counterclockwise force being applied to the sector 54 and pedal assembly 14 is released (e.g., by the user releasing the pedal pad 50) In this position, the pawl 84 is still urged counterclockwise toward the sector 54.

Figure 12:
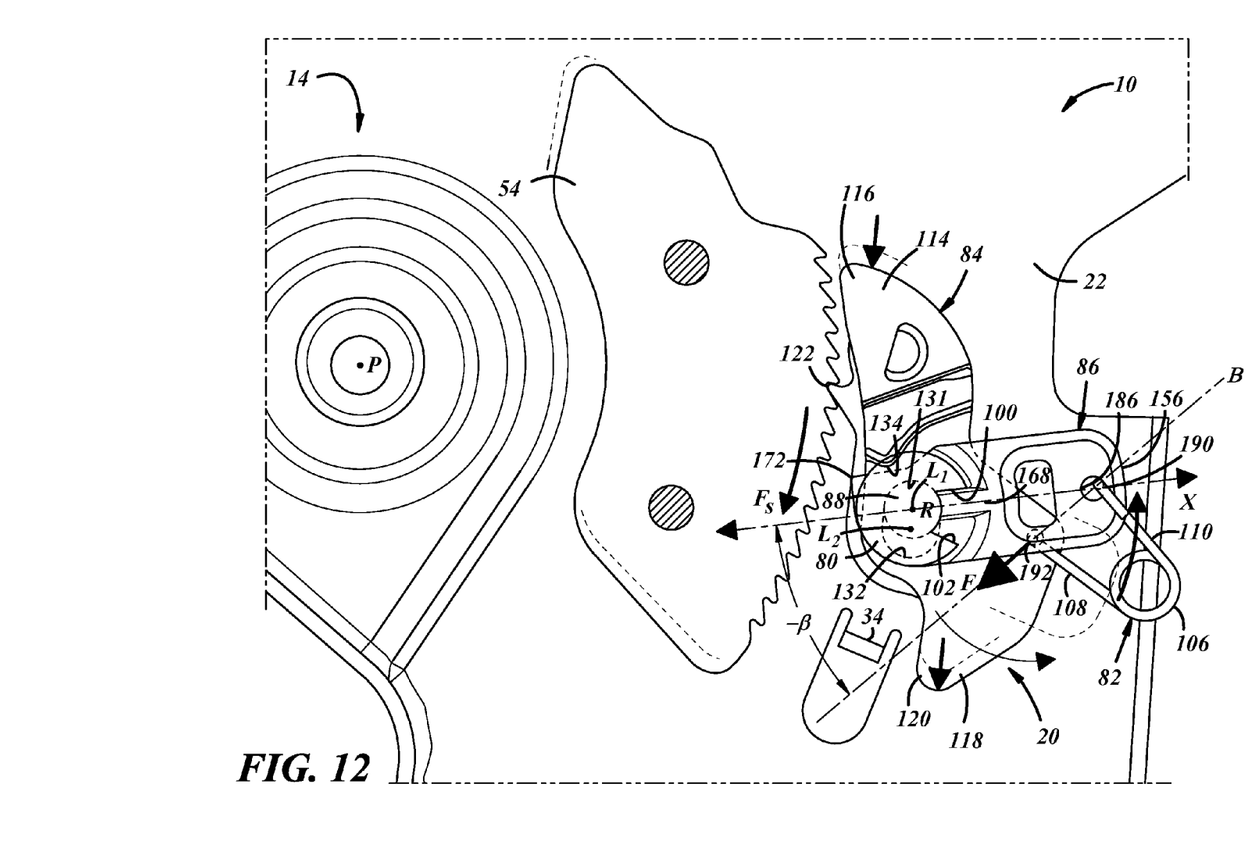
FIG. 12 is a partial sectional view of the parking brake actuator where the hook of the pawl has shifted between the two teeth of the sector and the pawl has shifted with respect to the rivet shaft into a full brake-applied position.

In FIG. 12, little or no force is being applied to pedal pad 50, and the brake actuator 10 is in the brake-applied position. Tension in control cable 16 (not shown) applies a clockwise force $F_S$ on sector 54. This force $F_S$ drives (e.g., shifts or translates) pawl 84 relative to the rivet 80 so that rivet shaft 88 nears or abuts the first slot end 131 of opening 130 and axis R may coincide with locus point $L_1$ (see also FIG. 13). This sliding or translating of pawl 84 causes driving member 134 on the pawl 84 to contact driven surface 172 on the flipper 86 and rotate the flipper 86 counterclockwise about rivet 80. Flipper 86 rotates counterclockwise until the projection 168 abuts against first travel stop 100 which resists further counterclockwise rotation of flipper 86. In this brake-applied position, the second contact point 192 has crossed plane X, and the spring force F now tends to rotate the pawl 84 clockwise away from the sector 54. In addition, the angle ($\beta$) is now negative. It will be appreciated that the value of negative angle ($\beta$) may be suitably large enough to ensure that pawl 84 will displace from sector 54 when the sector 54 is moved further counterclockwise (e.g., during parking brake release by the user). Thus, in at least one embodiment, the suitably large value of the angle ($\beta$) may account for manufacturing tolerances of one or more components of brake actuator 10 (e.g., and their respective stack up). Thus in FIG. 12, the pawl 84 is biased away from sector 54 but such movement is prevented by engagement of hook 122 with a tooth 60 of sector 54. Thus, once the hook 122 is released from teeth 60, pawl 84 will rotate clockwise about rivet 80 and move away from the sector 54 so that the control mechanism 20 does not interfere with the sector 54 as the sector returns to its initial brake-released position.

Figures 13, 16:
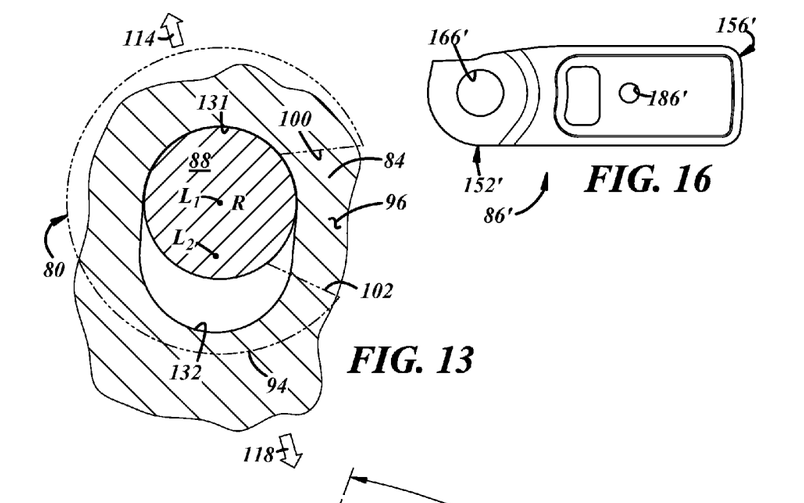
FIG. 13 is an enlarged view of the partial sectional view shown in FIG. 12, the rivet head shown in phantom to illustrate the position of the pawl relative to the rivet shaft.
FIG. 16 is a side view of another embodiment of the flipper shown in FIGS. 5.
Figure 14:
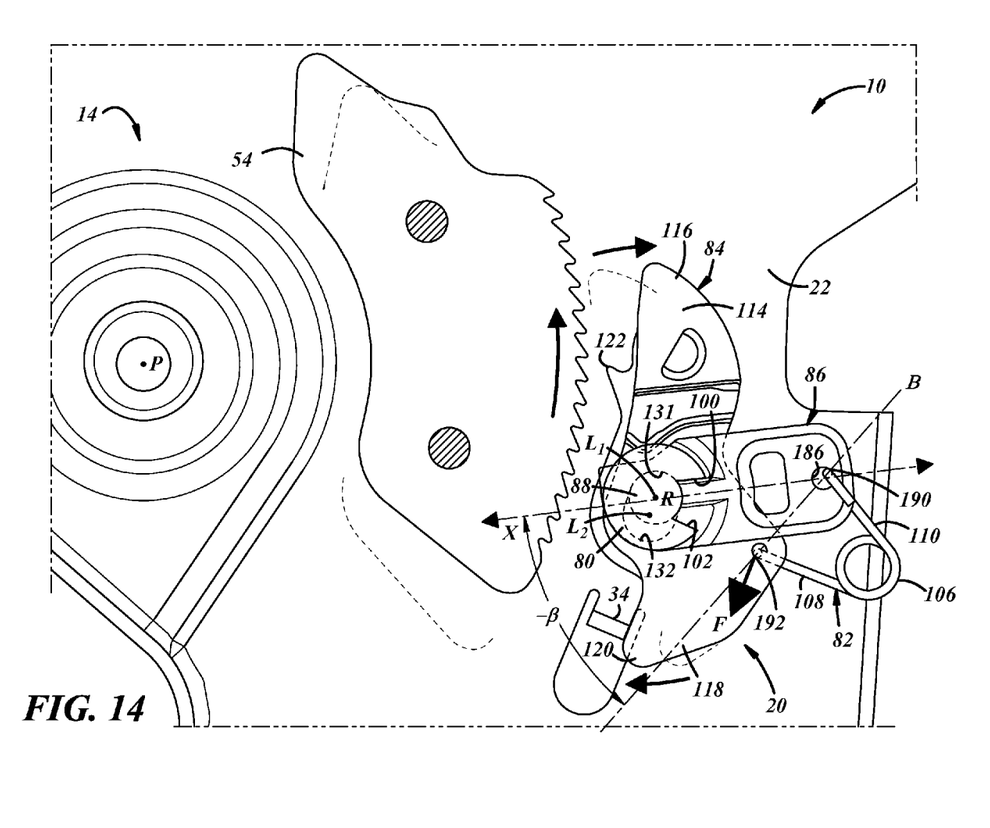
FIG. 14 is a partial sectional view of the parking brake actuator where the hook of the pawl is freed from the sector and the sector has rotated counterclockwise about the rivet shaft.

In FIG. 14, pedal assembly 14 has been rotated at least partially counterclockwise from the brake-applied position to release the wheel brake mechanism (e.g., a push-to-release). As sector 54 rotates counterclockwise, cable tension (e.g., the force $F_S$ which was shown in FIG. 12) is released from hook 122, and pawl 84 rotates clockwise as urged by the spring 82 until pawl 84 engages the stop 34. Counterclockwise rotation of flipper 86 is prevented as projection 168 abuts stop 100 on rivet 80. Thus, in this partially released-position, force F still tends to rotate pawl 84 clockwise (the angle ($\beta$) may remain negative). In addition, pawl 84 remains in a position where the first slot end 131 engages the rivet shaft 88 (e.g., where axis R coincides with locus point $L_1$, as shown in FIG. 13).

Figure 15:
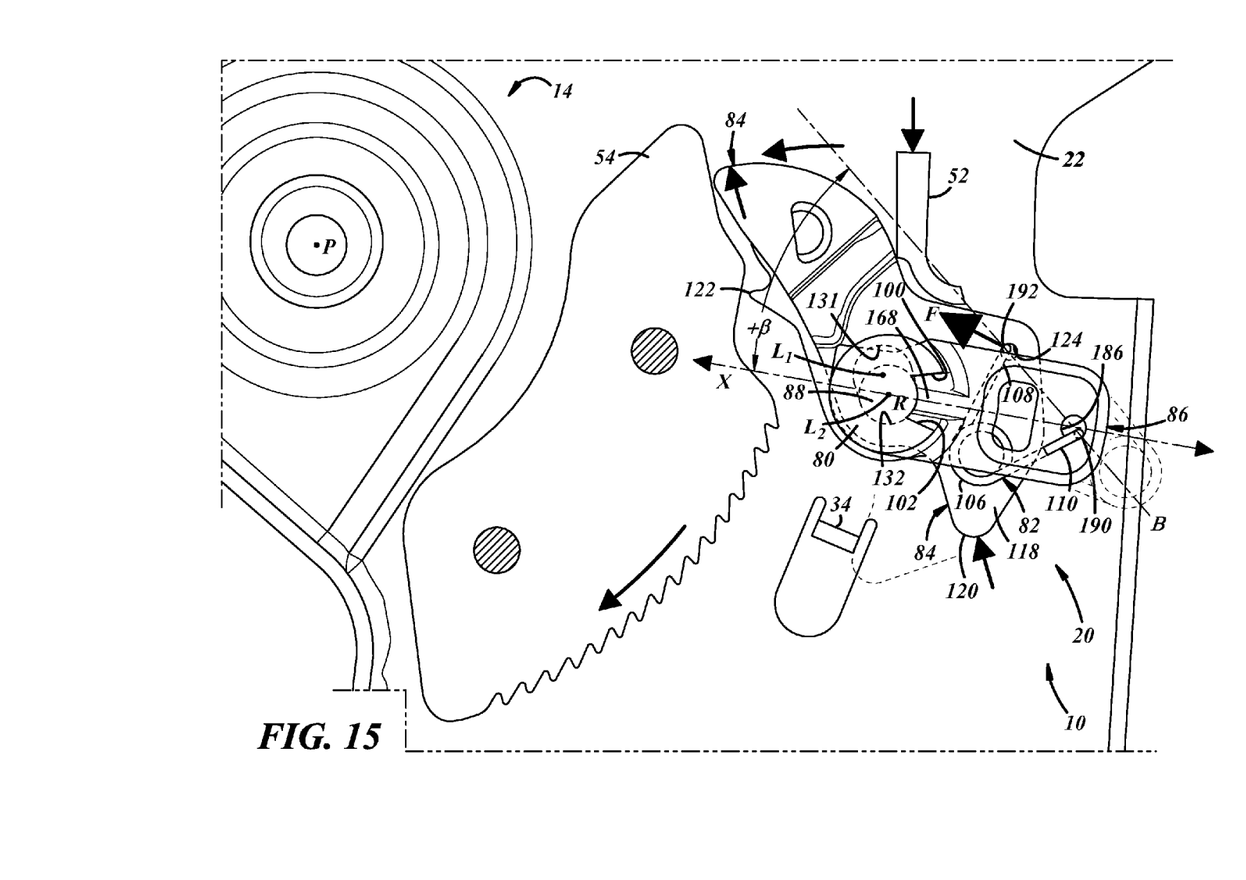
FIG. 15 is a partial sectional view of the parking brake actuator where a bumper coupled to the sector drives the pawl counterclockwise toward the initial position of the pawl shown in FIG. 8.

In FIG. 15, pedal assembly 14 has rotated clockwise to the initial brake-released position (e.g., in response to control cable 16 tension). During this movement, bumper 52 (on first bracket 40) of pedal assembly 14 engages the head 114 of pawl 84 and rotates pawl 84 counterclockwise thereby resetting the pawl 84 to its starting position, which is the position that the pawl 84 was in when the assembly was in the initial brake-released position. As head 114 is driven counterclockwise, leg 108 of spring 82 also displaces so that second contact point 192 crosses over plane X, once again biasing pawl 84 in a counterclockwise direction (and angle ($\beta$) is again positive). The spring force F also slides the pawl 84 relative to rivet 80 so that rivet shaft 88 engages the pawl at the second end 132 of opening 130 (e.g., where axis R coincides with locus point $L_2$, as shown in FIG. 9). The flipper 86 too may return to its starting position, being located between stops 100, 102. Therefore, the control mechanism 20 and pedal assembly 14 have been reset to their starting positions and the process previously described (and shown in FIGS. 8-15) may be repeated as desired.

In some embodiments, end 116 of head 114 may touch or contact sector 54 (e.g., in a region without teeth) in the initial brake-applied position. In some instances, whether end 116 contacts sector 54 in the initial brake-released position is a function of the orientation of and magnitude of the forces acting on the control mechanism (e.g. the spring force, friction, location or stop surfaces).

Also, in some embodiments, the spring 82 may urge the pawl 84 toward sector 54 in the starting position. For example, in FIGS. 8 and 15, the spring 82 is shown biasing the pawl 84 neither clockwise nor counterclockwise; however, this is not required. In at least one embodiment, spring 82 may urge the pawl 84 counterclockwise in the starting position.

Figure 17:
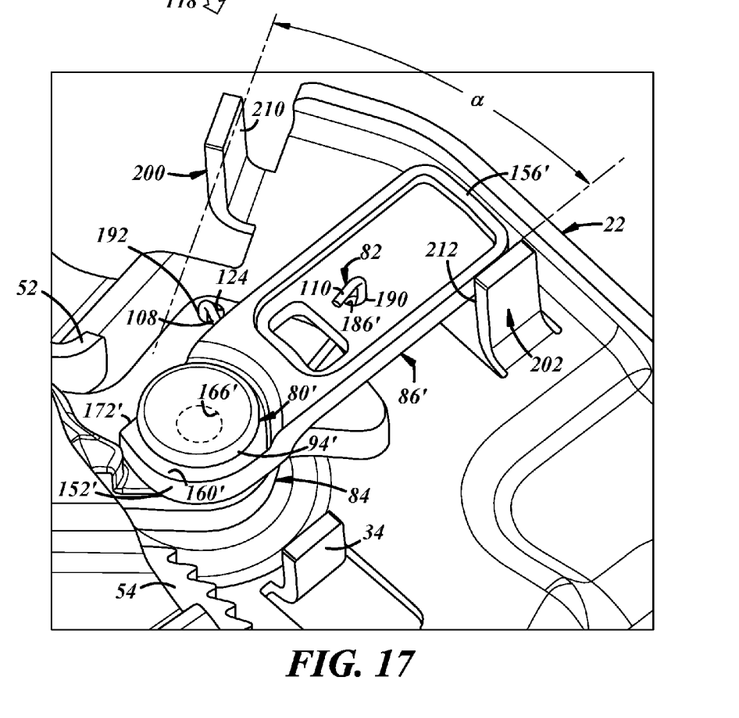
FIG. 17 is an enlarged perspective view of a portion of the parking brake actuator shown in FIG. 1 having an embodiment of the control mechanism that includes the flipper of FIG. 16.

Other embodiments also exist. For example, FIGS. 16 and 17 illustrate a different flipper 86' and a pair of flanges 200, 202 which are adapted to limit movement of flipper 86' and which may be integral to first bracket 22, (here, like reference numerals represent similar or like features or functions). In FIG. 16, a free end 156' of flipper 86' is spaced farther from coupling end 152' (than that shown in FIG. 5), and flipper 86' has no projection 168 (as shown in FIG. 5).

Although the distance between coupling and free ends 152', 156' is greater in this embodiment, the spacing between opening 166' and coupling region 186' (for leg 110 of spring 82) may be the same so that the torsional spring force F may act similarly to that described in FIGS. 8-15. The extra radially-extending length of free end 156' may be operable with the flanges 200, 202.

FIG. 17 illustrates an enlarged portion of one embodiment of the first bracket 22. Flanges 200, 202 are shown as tabs extending outwardly of first bracket 22 (toward second bracket 24). Flanges 200, 202 have inwardly facing travel stops or stop surfaces 210, 212, respectively. The spacing between stop surfaces 210, 212 may allow the width of the free end 156' of flipper 86' to move angularly therebetween. Other flange implementations are contemplated also.

During use, flanges 200, 202 may function to limit the travel of flipper 86', having a function similar to stops 100, 102 described above. According to one embodiment, free end 156' of flipper 86' may travel across angular range (α), as described above. Further, it will be appreciated that when parking brake actuator 10 utilizes flipper 86' and flanges 200, 202, head 94' of rivet 80' (FIG. 17) need not have the void 96 or stops 100, 102, as described above.

Thus, there has been disclosed a parking brake actuator for a wheel brake mechanism of a vehicle. In at least one implementation, the parking brake actuator is foot-operated enabling a vehicle user to depress a pedal pad to engage the brake mechanism, and then later depress the pedal pad again to release the brake mechanism. The parking brake actuator reciprocates between a brake-released position and a brake-applied position in repeated actuations of the brake actuator. The brake actuator includes an engagement member, a retention member, and an actuator. The retention member and actuator are acted upon by a biasing member that so that the retention member engages and automatically disengages from the engagement member to permit repeated and reliable actuation and release of the vehicle parking brake and repeatable resetting of the assembly for subsequent cycles.

It should be understood that all references to direction and position, unless otherwise indicated, refer to the orientation of the parking brake actuator illustrated in the drawings. In general, up or upward generally refers to an upward direction within the plane of the paper and down or downward generally refers to a downward direction within the plane of the paper.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A parking brake control assembly having a brake actuator movable between a first position and a second position, comprising:
    an engagement member coupled to the brake actuator; and
    a control mechanism comprising:
        a retention member that rotates about an axis;
        a release actuator that moves relative to the retention member as the brake actuator moves between the first and second positions, the release actuator rotating about the same axis as the retention member; and
        a biasing member acting on the retention member and responsive to the movement of the release actuator, wherein, in the first position of the brake actuator, the retention member is arranged to engage the engagement member upon movement of the brake actuator from the first position to the second position, and movement of the brake actuator from the first position to the second position causes the release actuator to move relative to the retention member such that the biasing member provides a force on the retention member that urges the retention member out of engagement with the engagement member.

2. The assembly of claim 1, wherein the retention member includes a slot sized to receive a coupler, the slot enabling translation and rotation of the retention member with respect to the coupler.

3. The assembly of claim 2, wherein the slot is smaller in one dimension than another dimension to permit rotation of the retention member relative to the coupler and to permit translation of the retention member relative to the coupler.

4. The assembly of claim 3, wherein the biasing member is coupled to the retention member so that translation of the retention member relative to the coupler changes the direction of force the biasing member provides on the retention member so that the biasing member yieldably biases the retention member for rotation in a first direction about the coupler before translation of the retention member and the biasing member yieldably biases the retention member for rotation in a second direction about the coupler after translation of the retention member.

5. The assembly of claim 4, wherein the biasing member is also coupled to the release actuator and translation of the retention member causes rotation of the release actuator relative to the coupler.

6. The assembly of claim 1, wherein the biasing member includes a spring having a first leg coupled to the retention member and a second leg coupled to the release actuator.

7. The assembly of claim 1, wherein the retention member and the release actuator are coupled by the biasing member and received for rotation about a coupler, wherein a plane is defined that includes an axis of the coupler and a point of contact of the biasing member with the release actuator, and when a point of contact between the biasing member and the retention member is on one side of the plane, the retention member is urged toward the engagement member, and when the point of contact between the biasing member and the retention member is on an opposite side of the plane, the retention member is urged away from the engagement member.

8. The assembly of claim 7 wherein the point of contact between the biasing member and the retention member is on said one side of the plane when the brake actuator is in the first position and the point of contact between the biasing member and the retention member is on said opposite side of the plane when the brake actuator is in the second position.

9. The assembly of claim 1, wherein the control mechanism further comprises a stop surface which limits movement of the release actuator.

10. The assembly of claim 9, wherein the control mechanism further comprises a coupler about which the release actuator rotates, and the coupler includes the stop surface.

11. The assembly of claim 10, wherein the release actuator comprises a projection for engaging the stop surface.

12. The assembly of claim 10, which further comprises a bracket that carries or includes the stop surface spaced from the coupler.

13. The assembly of claim 1, wherein, as the brake actuator moves from the first position to the second position, a driving portion of the retention member engages a driven surface of the release actuator and moves the release actuator so that the biasing member urges the retention member away from the engagement member.

14. The assembly of claim 1, further comprising a bumper adapted to move the retention member to a starting position as the brake actuator moves from the second position to the first position.

15. A parking brake control assembly, comprising:
a brake actuator movable between a first position and a second position;
an engagement member carried by the brake actuator for movement with the brake actuator; and
a control mechanism comprising:
  a coupler having an axis;
  a retention member arranged for rotation about the axis of the coupler and translation relative to the coupler;
  a release actuator arranged for rotation about the axis of the coupler and for rotation relative to the retention member; and
  a biasing member coupled to the retention member and the release actuator to yieldably bias the retention member for rotation about the coupler,
wherein when the brake actuator is in the first position the biasing member biases the retention member in a first direction about the coupler and movement of the brake actuator from the first position to the second position causes movement relative to the coupler of the retention member and the release actuator so that the biasing member biases the retention member in a second direction about the coupler that is opposite to the first direction.

16. The assembly of claim 15, wherein the first direction corresponds to rotation of the retention member in a direction that provides the retention member within a path of movement of the engagement member, and the second direction corresponds to rotation of the retention member in a direction that removes the retention member from the path of movement of the engagement member.

17. The assembly of claim 15, wherein the retention member includes a slot in which a portion of the coupler is received, the slot enabling translation and rotation of the retention member with respect to the coupler.

18. The assembly of claim 17, wherein the slot is smaller in one dimension than another dimension to permit rotation of the retention member relative to the coupler and to permit translation of the retention member relative to the coupler.

19. The assembly of claim 15 wherein the brake actuator pivots to define a path of movement of the engagement member, and the brake actuator reciprocates between the first position and second position during repeated actuations of the brake actuator.

20. The assembly of claim 19 which also comprises a cable coupled to the brake actuator or engagement member and applying a force on one or both of the brake actuator and engagement member when the brake actuator is in the second position.

* * * * *